US009661030B2

(12) United States Patent
Bao et al.

(10) Patent No.: US 9,661,030 B2
(45) Date of Patent: May 23, 2017

(54) BUILDING AND SWITCHING IP MULTIMEDIA SESSIONS

(71) Applicant: International Business Machines Corporation, Armonk, NY (US)

(72) Inventors: Sheng Hua Bao, Beijing (CN); Jian Chen, Beijing (CN); Zhong Su, Beijing (CN); Xin Ying Yang, Beijing (CN); Xiang Zhou, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 419 days.

(21) Appl. No.: 13/665,463

(22) Filed: Oct. 31, 2012

(65) Prior Publication Data

US 2013/0124723 A1 May 16, 2013

(30) Foreign Application Priority Data

Oct. 31, 2011 (CN) .......................... 2011 1 0347152

(51) Int. Cl.
*G06F 15/173* (2006.01)
*H04L 29/06* (2006.01)

(52) U.S. Cl.
CPC ...... *H04L 65/1066* (2013.01); *H04L 65/1016* (2013.01); *H04L 65/1069* (2013.01); *H04L 65/1073* (2013.01); *H04L 65/80* (2013.01)

(58) Field of Classification Search
USPC ......... 709/224–253; 370/351–546; 340/1–16
See application file for complete search history.

(56) References Cited

U.S. PATENT DOCUMENTS

| 6,317,438 | B1* | 11/2001 | Trebes, Jr. .................... 370/466 |
| 6,788,688 | B2* | 9/2004 | Trebes, Jr. ................. 370/395.1 |
| 6,910,074 | B1* | 6/2005 | Amin et al. .................. 709/227 |
| 7,987,233 | B1* | 7/2011 | Osborne et al. .............. 709/206 |
| 8,040,807 | B2* | 10/2011 | Pai et al. ....................... 370/236 |
| 8,046,429 | B2* | 10/2011 | Tarkoma et al. ............. 709/217 |
| 8,161,158 | B2* | 4/2012 | Curcio et al. ................ 709/226 |
| 8,204,995 | B2* | 6/2012 | Sathish ........................ 709/227 |

(Continued)

FOREIGN PATENT DOCUMENTS

| CN | 1703690 A | 11/2005 |
| CN | 101299747 A | 11/2008 |

(Continued)

OTHER PUBLICATIONS

Examination Report for Application No. GB1218261.4; dated Dec. 20, 2013; 3 pages.

(Continued)

*Primary Examiner* — Hua Fan
(74) *Attorney, Agent, or Firm* — Cantor Colburn LLP (57) ABSTRACT

Embodiments of the present disclosure include methods and systems of building an IP multimedia session without the use of a central server and switching IP multimedia session among devices. The method of building an IP multimedia session includes receiving a registering request from a plurality of IP multimedia session participant devices, electing a service device from the plurality of participant devices, and building IP multimedia session among the plurality of participant devices by using the elected service device.

18 Claims, 8 Drawing Sheets

(56) References Cited

U.S. PATENT DOCUMENTS

| | | | |
|---|---|---|---|
| 8,351,393 B2* | 1/2013 | Lamer et al. | 370/331 |
| 8,549,151 B2* | 10/2013 | Stokking et al. | 709/227 |
| 8,656,017 B2* | 2/2014 | Wang et al. | 709/226 |
| 8,819,199 B2* | 8/2014 | Matuszewski | 709/221 |
| 2002/0194324 A1* | 12/2002 | Guha | 709/223 |
| 2005/0114541 A1* | 5/2005 | Ghetie et al. | 709/232 |
| 2007/0071226 A1 | 3/2007 | Neuhaus et al. | |
| 2008/0039097 A1* | 2/2008 | Sathyanarayan | 455/442 |
| 2008/0263219 A1* | 10/2008 | Bacchi et al. | 709/231 |
| 2008/0285487 A1 | 11/2008 | Forslow et al. | |
| 2008/0288580 A1 | 11/2008 | Wang et al. | |
| 2008/0320497 A1 | 12/2008 | Tarkoma et al. | |
| 2009/0303964 A1 | 12/2009 | Lamer et al. | |
| 2010/0023624 A1* | 1/2010 | Long et al. | 709/227 |
| 2010/0142448 A1* | 6/2010 | Schlicht et al. | 370/328 |
| 2010/0161806 A1* | 6/2010 | Qiu | H04L 12/66 709/227 |
| 2010/0174560 A1* | 7/2010 | Quan et al. | 705/3 |
| 2011/0010459 A1 | 1/2011 | Stokking et al. | |
| 2011/0019620 A1* | 1/2011 | Wang | 370/328 |
| 2011/0110505 A1 | 5/2011 | Arthur et al. | |

FOREIGN PATENT DOCUMENTS

| | | |
|---|---|---|
| DE | 102012219970 A1 | 10/2012 |
| GB | 2496260 A | 5/2013 |
| WO | 2004036432 A1 | 4/2004 |

OTHER PUBLICATIONS

Examination Report under Section 18(3) for Application No. GB1218261.4; Date of Report: Aug. 19, 2013; 5 pgs.

Response to Examination Report for United Kingdom Patent Application No. 1218261.4; dated Oct. 21, 2013; 5 pgs.

Combined Search and Examination Report under Sections 17 and 18(3); for Application No. GB1218261.4; Dated Feb. 19, 2013; 6 pgs.

"MMTeL for Convergence", Ericcson White Paper, Jul. 27, 2010. URL: http://www.ericsson.com/res/docs/whitepapers/mmtel.pdf.

Mas, et al., "IPTV Session Mobility", Communications and Networking in China, 2008. China COM. Aug. 25-27, 2008, pp. 903-909.

\* cited by examiner

BUILDING AND SWITCHING IP MULTIMEDIA SESSIONS

CROSS-REFERENCE TO RELATED APPLICATION

This application claims priority to Chinese Patent Application No. 201110347152.5 filed Oct. 31, 2011, the entire contents of which are hereby incorporated by reference.

BACKGROUND

The present invention relates to Internet Protocol (IP) multimedia sessions, and more specifically to methods and systems of building IP multimedia sessions without the use of a central server.

The transmission of multimedia signals such as voice and video through IP is becoming increasingly common. Typically, in order to transmit multimedia signals, an IP multimedia session must be established. There are many public or private protocols for building IP multimedia sessions, e.g., Session Initiation Protocol (SIP) and the like. IP Multimedia Subsystem (IMS) is a network structure defined by the $3^{rd}$ Generation Partnership Project (3GPP) that uses SIP to build multimedia sessions. A terminal device can use IP for transmitting multimedia information such as voice, image, video etc. through the IMS. Specific applications thereof may include telephone conferences and video conferences.

The building of a traditional IP multimedia session depends on a central server (e.g. an IMS system) that includes a central application server and a central media server. The application server is used for building the IP multimedia session (e.g., building a session according to the SIP) and for controlling service logic of the session. The media server is used for transmitting and processing actual multimedia signals. The advantage of the IP multimedia session depending on the central server is that it can support public or private session protocols and process complex service logic, and that the interface defined thereby is also consistent with the Internet Engineering Task Force (IETF) Internet standard. However, the building and maintaining of IP multimedia sessions that are dependent on the central server has a disadvantage of high dependence on the central server, and thus, the central server side has a relatively high computing pressure and the computing capability of the terminal device may not be sufficiently utilized. For example, if a small percentage of employees of an enterprise living in the same city want to have a telephone conference, they have to build an IP multimedia session by means of a remote central server of the enterprise located abroad, thereby causing excessive remote transmissions.

Another way to build IP multimedia session is to build IP multimedia sessions by using protocols such as SIP under a point-to-point (P2P) transmission environment (e.g., P2P-SIP). This has the advantage of zero dependency on any central server but has disadvantages that include: due to the P2P transmission specification, there exist no terminals having an application server or media server function under the built IP multimedia session environment; any one of the "points" is connected with other points in an one-to-one relation, so that device discovering, session building, coordinating and controlling processes are very complex; only simple voice or video communication can be supported; and complicated service logic cannot be supported as in the traditional IP multimedia session.

SUMMARY

Embodiments of the disclosure include a method of building an internet protocol (IP) multimedia session includes receiving a registering request from each of a plurality of IP multimedia session participant devices, electing a service device from the plurality of participant devices and building the IP multimedia session among the plurality of participant devices by using the elected service device.

Embodiments of the disclosure also include a computer system for building an IP multimedia session. The computer system includes a processor that is configured to perform a method. The method includes receiving a registering request from each of a plurality of IP multimedia session participant devices, electing a service device from the plurality of participant devices and building the IP multimedia session among the plurality of participant devices by using the elected service device.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

By describing in detail the embodiments shown in combination with the accompanying drawings, the above and other features of the present invention are more apparent, wherein the same reference signs in the accompanying drawings represent the same or similar composite parts, wherein.

DETAILED DESCRIPTION

The methods and systems for building an Internet Protocol (IP) multimedia session provided by the present invention will be described in detail below through the embodiments with reference to the accompanying drawings.

Figure 1:
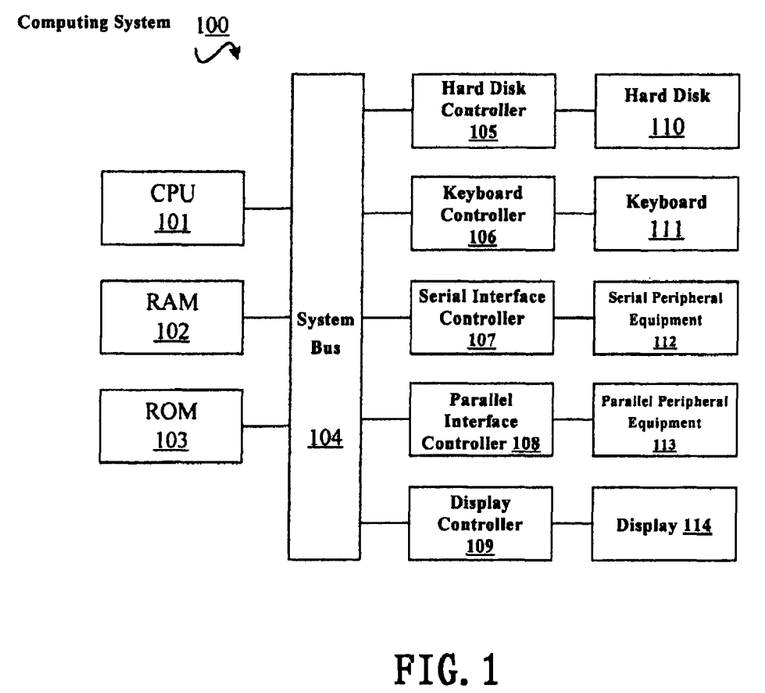
FIG. 1 is a block diagram showing an exemplary computing system which is adapted to implement the embodiments of the present invention.

FIG. 1 shows an exemplary computing system 100 which is adapted to implement the embodiments of the present invention. As shown in FIG. 1, the computing system 100 may include: CPU (central processing unit) 101, RAM (random access memory) 102, ROM (read only memory) 103, System Bus 104, Hard Disk Controller 105, Keyboard Controller 106, Serial Interface Controller 107, Parallel Interface Controller 108, Display Controller 109, Hard Disk 110, Keyboard 111, Serial Peripheral Equipment 112, Parallel Peripheral Equipment 113 and Display 114. As shown in FIG. 1, the CPU 101, RAM 102, ROM 103, Hard Drive Controller 105, Keyboard Controller 106, Serial Interface Controller 107, Parallel Interface Controller 108 and Display Controller 109 are coupled to the System Bus 104. In addition, the Hard Disk 110 is coupled to Hard Disk Controller 105, Keyboard 111 is coupled to Keyboard Controller 106, Serial Peripheral Equipment 112 is coupled to Serial Interface Controller 107, Parallel Peripheral Equipment 113 is coupled to Parallel Interface Controller 108, and the Display 114 is coupled to Display Controller 109. It should be understood that, the structure as shown in FIG. 1 is only for exemplary purposes rather than any limitation to the present invention. In some cases, some devices may be added or removed from the computing system 100 based on specific embodiments.

Figure 2:
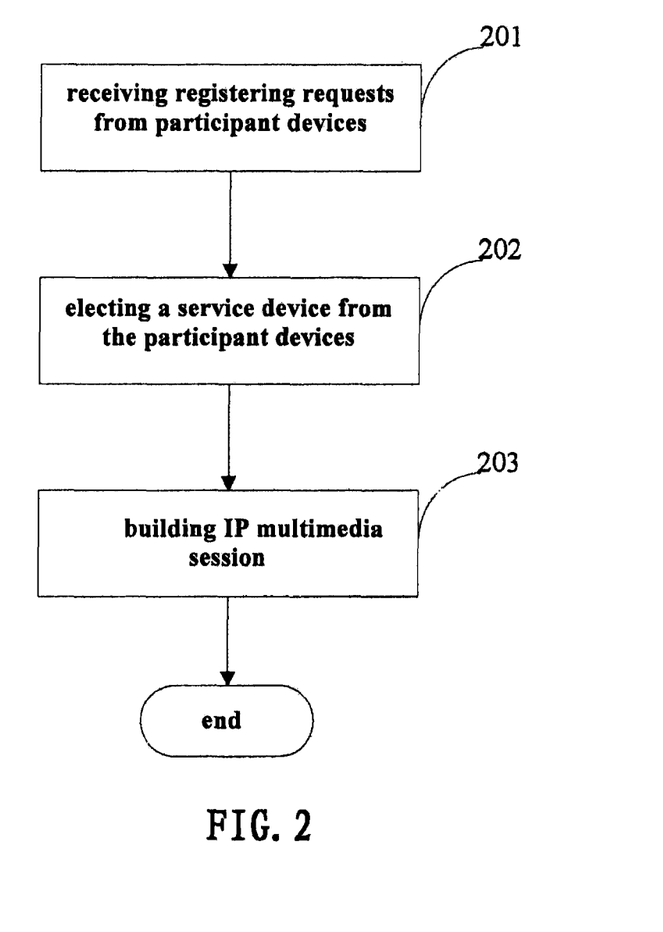
FIG. 2 is a flow chart showing a method of building an Internet Protocol (IP) multimedia session according to an embodiment of the present invention.

Referring now to FIG. 2, a flow chart illustrating a method of building an IP multimedia session according to an embodiment of the present invention is shown. As shown at block 201, the method includes receiving a registering request from a plurality of IP multimedia session participant devices. An IP multimedia session participant device is a terminal device requesting to build or participate in the IP multimedia session and may include, but is not limited to, a mobile phone, a personal digital assistant (PDA), a desktop computer or any other electronic device capable of receiving or transmitting multimedia signals. In exemplary embodiments, the registering request of the participant device is submitted with a remote directory server in advance before building the IP multimedia session. For example, if a telephone conference is to be held at a predetermined time moment, invited terminals can be proactively or automatically registered with the remote directory server before the predetermined time moment. In exemplary embodiments, the registering request of the participant device is issued to a participant device acting as a moderator device during building the multimedia session. The moderator device is configured to moderate the process of building the IP multimedia session and the moderator device may also serve as the media server or application server.

In exemplary embodiments, the IP multimedia session participant device supports an IP multimedia session protocol stack for activating the media service function or application service function. In one embodiment, the IP multimedia session protocol stack is a Session Initiation Protocol (SIP) protocol stack. In another embodiment, the IP multimedia session protocol stack may be any other public or private IP multimedia session protocol.

Next, the method shown in FIG. 2 proceeds to a block 202, at which a service device is elected from the participant devices. In exemplary embodiments, the service device includes at least one of a media service device and an application service device. The media service device is a participant device playing a role of media server and the application service device is a participant device playing a role of application server. In the IP multimedia session, the application server is used for building the IP multimedia session (e.g., building the session according to the SIP) and controlling service logic of the session, and the media server is used for transmitting and processing actual multimedia signals.

In exemplary embodiments, the media service device and the application service device may be elected according to a quality of service (QoS) parameter of the participant device. The QoS parameter can include, but is not limited to, availability, throughput, time delay, time delay variation (jitter), packet loss rate, and disorder rate. In exemplary embodiments, the media service device and the application service device may be elected according to hardware capability of the participant device. Capability parameters of the device may include, but are not limited to, central processing unit (CPU) frequency, CPU usage status, memory size, memory usage status, bandwidth, and bandwidth utilization ratio. In exemplary embodiments, the media service device and the application service device may be elected in combination with the QoS parameter and the hardware capability of the participant device.

In exemplary embodiments, a device whose capability is optimal or whose QoS parameter index is optimal is elected from the participant devices as the media service device. A device whose capability is sub-optimal and whose QoS parameter index is sub-optimal is elected from the participant devices as the application service device. Since the media service device is mainly used for transmitting actual multimedia signals it has a higher requirement on the device capability. Of course, those skilled in the art should appreciate that, how to elect the media service device or application service device according to various parameters and indexes relies on one or more predetermined election rules, without influencing the achievement of the object of the present invention.

In exemplary embodiments, the election process may also include negotiation. For example, a participant device may have a high synthetical capability score and thus would be elected as a service device by nature, but the participant device or other participant device may not agree to elect it as the media service device in consideration of data security, and it would rather elect a participant device with a general capability as the service device.

In exemplary embodiments, the media service device and the application service device may be the same participant device. In exemplary embodiments, the media service device and the application service device may be different participant devices.

Continuing with reference to FIG. 2, as illustrated at block 203, the method includes building an IP multimedia session among the plurality of participant devices by using the elected media service device and application service device. Since the media service device and the application service device have been elected from the participant devices, the IP multimedia session can be built among the plurality of participant devices in block 203 by using any common technical knowledge in the art, according to a specific session protocol.

Figure 7:
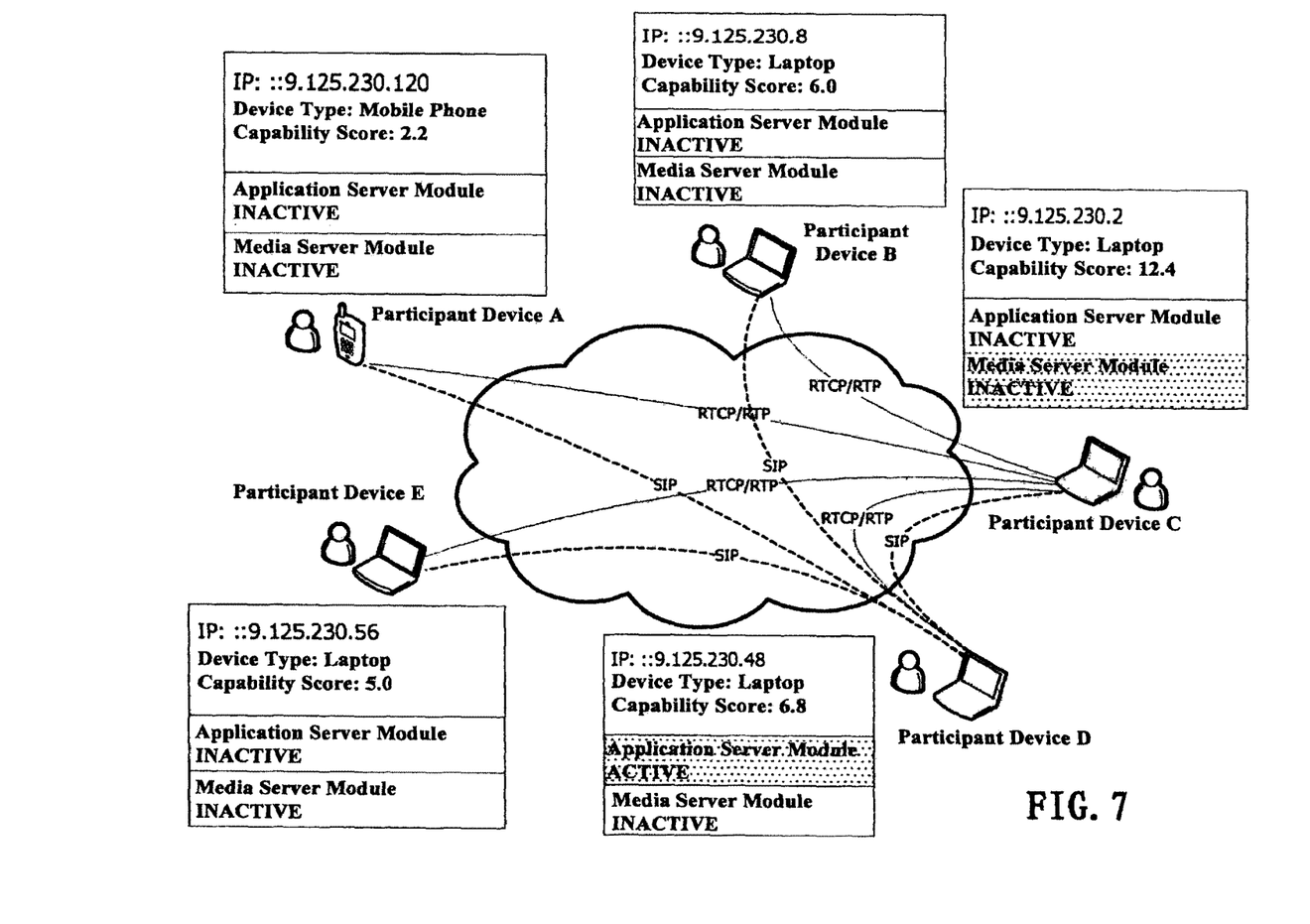
FIG. 7 is a schematic diagram showing electing of the media service device and the application service device by using the SIP protocol in accordance with an exemplary embodiment.

Referring now to FIG. 7, a schematic diagram showing election of the media service device and the application service device by using the SIP protocol in accordance with an exemplary embodiment is shown. As illustrated, participant devices A-E are attempting to build IP multimedia session without the use of a central server. Synthetical capability scores are given to the devices A-E according to the QoS parameter index and the device capability index as follows: 2.2 for device A, 6.0 for device B, 12.4 for device C, 6.8 for device D, and 5.0 for device E. If the predetermined rule is assumed as that "the participant device whose synthetical score is the highest is elected as the media service device, and the participant device whose synthetical score is the second highest is elected as the application service device", then the device C is elected as the media service device and the device D is elected as the application service device. Further as shown in FIG. 7, a dotted line represents a SIP signaling transmission flow, and a solid line represents an actual multimedia signal transmission flow. Therefore, the multimedia signals (solid line) received by all the participant devices in FIG. 7 all come from the device C, and all the SIP signaling comes from the device D. In the built IP multimedia session shown in FIG. 7, only participant devices are involved, without depending on a central media server or a central application server.

In exemplary embodiments, through the method shown in FIG. 2 and FIG. 7, an IP multimedia session can be built among participants without depending on the central server. Moreover, since the IP multimedia session shown in FIG. 7 is not point-to-point (P2P) transmission (for example, the transmission of multimedia signals between the device A and the device B is made through the device C rather than a direct transmission), the IP multimedia session built in FIG. 7 can also support methods and systems with complicated service logic as the traditional IP multimedia session.

Figure 3:
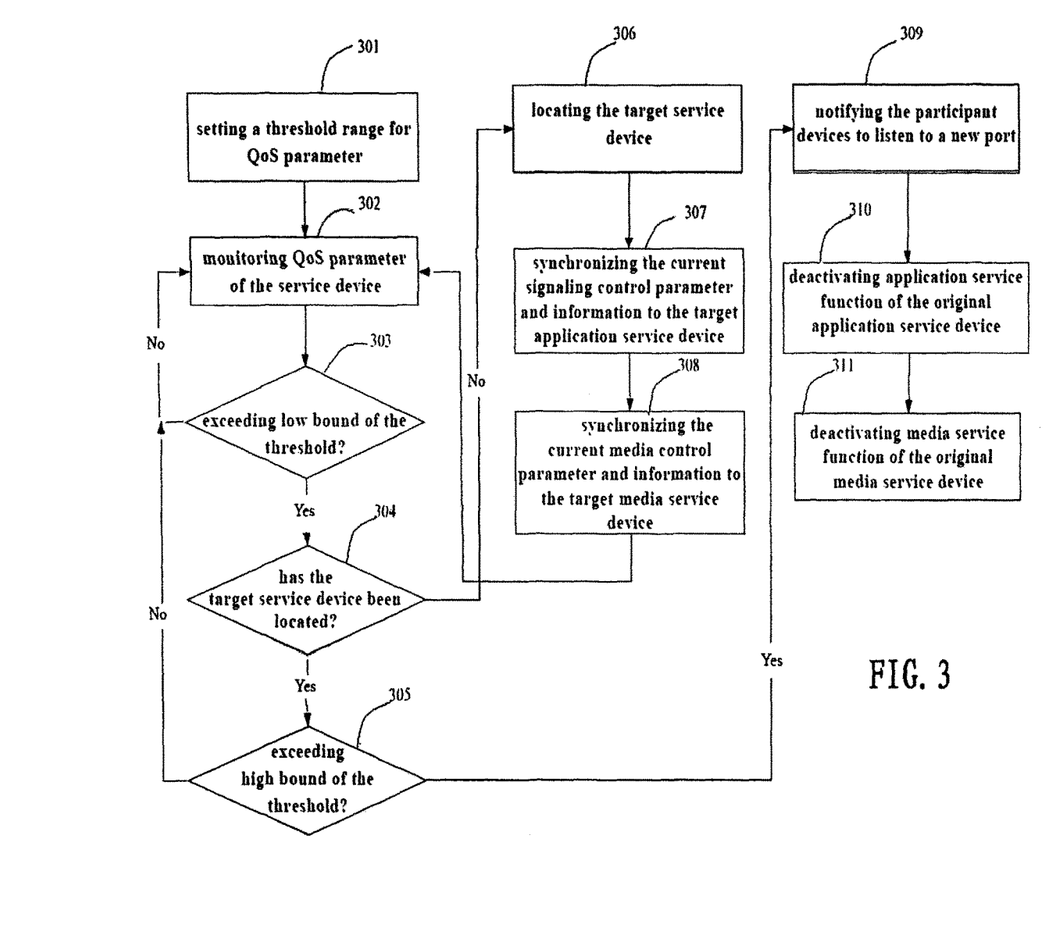
FIG. 3 is a flow chart showing a method of building an IP multimedia session according to another embodiment of the present invention.

Referring now to FIG. 3, a flow chart showing a method of building an IP multimedia session according to an exemplary embodiment is shown. As illustrated, the process starts at block 301 by setting a threshold range of a capability index parameter. After the IP multimedia session is built, it is possible that the capability of the participant device that was previously elected as the media service device or the application service device is changed during the operation thereof, and reasons for this change include, but are not limited to, a new participant device joins the IP multimedia session, the participant device that was elected as the media service device or application service device executes other workload, etc. Accordingly it may be necessary to switch the media service device or application service device dynamically as needed after the IP multimedia session is built. In exemplary embodiments, the threshold range of the capability index parameter can be set to trigger the switching operation. The threshold range of the parameter can be set according to experience history data, or adjusted over time according to the change in system and network environment.

Next, as illustrated at block 302, the method includes monitoring the elected media service device and application service device. In exemplary embodiments, the monitoring may include monitoring the QoS parameter of the service device. In exemplary embodiments, the monitoring may be real time and continuous. In exemplary embodiments, the monitoring may include sampling at a certain time interval.

As shown at block 303, the method includes determining whether the monitored QoS parameter of the media service device or the application service device exceeds the low bound of the set threshold range. If the QoS parameter exceeds the low bound, it indicates that the QoS level of the service device has dropped to a certain degree and it may be necessary to switch the service device. Next, as shown at block 304, the method includes determining whether a target service device has been located. The target service device may be a service device to be switched to once switching is triggered and may include a target application service device and a target media service device. If it is determined that the monitored QoS parameter of the media service device or the application service device does not exceed the low bound of the set threshold range, the method returns to the block 302 to continue monitoring the QoS parameter of the media service device or the application service device.

Continuing with reference to FIG. 3, as shown at block 306, the method includes locating a target media service device or target application service device to be switched to. The operation of locating the target service device may be similar to the operation of electing the media service device and the application service device in the block 202 of the method shown in FIG. 2, also according to the hardware capability and the QoS parameter index of the device. It should be noted that, the block 306 differs from the block 202 in that, the target service device to be switched to in the block 306 can be either a central server or other participant devices (e.g., participant devices newly joining the IP multimedia session). In exemplary embodiments, the target service device can include the central server (central application server and central media server) because the newly joining participant devices may result in that QoS parameters of all the participant devices do not satisfy the requirements of acting as the media service device or application service device. In exemplary embodiments, the IP multimedia session can be built among the participant devices by themselves without depending on the central server and can be freely switched to the traditional session mode depending on the central server at any moment.

Next, the method proceeds to block 307 and synchronizes current signaling control parameter and information to the located target application service device. In exemplary embodiments, it may be necessary to process and transmit the signaling control information simultaneously on the original application service device and the target application service device, rather than deactivating the original application service device. In exemplary embodiments, the signaling control information may comprise contents such as which participant device has rights to listen to voice under which condition in the telephone conference.

In addition to synchronization of the signaling control parameter and information, it may also be necessary to synchronize the current media control parameter and information to the located target media service device, as shown at block 308. In exemplary embodiments, only the media control parameter and information may be synchronized, rather than actual multimedia signals. In other words, actual multimedia signals may only be transmitted by the original media service device, but not transmitted by the located target media service device at the same time. If two sets of multimedia signals are transmitted at the same time, it may result in waste of a lot of bandwidth and computing resources. Although only transmitting a set of multimedia signals may result in loss of partial multimedia data packets upon the real switching in the future, this can be overcome by using know packet loss solutions. In exemplary embodiments, those skilled in the art could transmit two sets of multimedia signals in the switching preparation stage like the signaling control information.

Continuing with reference to FIG. 3, if the result of the judgment in block 304 is Yes, the method proceeds to block 305 and the method includes judging if the monitored QoS parameter value of the service device exceeds high bound of the predetermined parameter threshold. If the monitored QoS parameter value of the service device does not exceed the high bound of the predetermined parameter threshold, switching is not needed, and the method returns to block 302. Otherwise, the method proceeds to block 309 and the method includes notifying a plurality of participant devices to listen to a new port. In exemplary embodiments, signaling information may have been transmitted simultaneously by the original application service device and the target application service device, so each participant device may need to initiate two ports to simultaneously receive signaling control information issued by the two application service devices (switching preparation stage), and at the time of real switching, it is not necessary to continue using the port corresponding to the original application service device. Accordingly, it may be necessary to notify the participant device to listen to the port corresponding to the target application service device. For example, in the SIP protocol, the computer initiates the default 5060 port to listen to the SIP information, then at the switching preparation stage, in order to listen to the SIP information of the target application service device, it is necessary to initiate a new port (e.g., 5061) to receive it. When the time to switch the application service device comes, the participant device is notified to close the original 5060 port and listen to the 5061 port, so as to receive the SIP information coming from the new application service device.

As illustrated at block 310, the method includes deactivating the application service function of the original application service device. Correspondingly, at block 311, the media service function of the original media service device is deactivated, such that the actual multimedia signals are switched to be transmitted by the target media service device. While, FIG. 3 does not show blocks of activating the target application service device or the target media service device, those skilled in the art should appreciate that, it is needed to activate the service function of the target service device at the switching preparation stage.

In exemplary embodiments, when the method returns from block 308 to the blocks 302 and 303, if the result of block 303 is No, then the following block can be added: canceling the synchronization operation at blocks 307 and 308, and canceling activation of the target service device (in the case where the target service device is a participant device), and then returning to block 302 to continue monitoring. It should be noted that FIG. 3 shows directly returning from block 308 to block 302 in order to provide an opportunity to terminate the switching preparation flow (blocks 306-308) when the QoS parameter is less than the threshold low bound again, thereby saving resource consumption.

In exemplary embodiments, the QoS level may be inversely proportional to the QoS parameter value, i.e., the poorer QoS is, the higher the QoS parameter value is. Of course, those skilled in the art could see that the two are in a direct proportion, that it only needs to firstly judge if it is less than the high bound and then judge if it is less than the low bound. It should be further noted that, although in the method shown in FIG. 3, the media service device and the application service device are collectively referred to as a "service device" for the purpose of simplicity, those skilled in the art will appreciate that, the switching of the media service device and the application service device can be monitored independently and made independently, that is to say, it is possible to only switch one of the media service device and the target service device.

It should be further noted that, although FIG. 3 shows a switching opportunity is determined according to the QoS parameter monitored in real time, it is also possible to perform the switching operation if the QoS parameter of the media service device or application service device does not exceed the threshold low bound or high bound. For example, a device among the plurality of participant devices becomes a device with the optimal capability due to sudden capability rise (possibly due to completion of job), so the originally elected media service device or application service device is not the device with the optimal capability among the participant devices any more (but still satisfies the requirements of acting as the service device), then for the purpose of optimizing the system capability, the device with the optimal capability can be switched to in this case.

Figure 8:
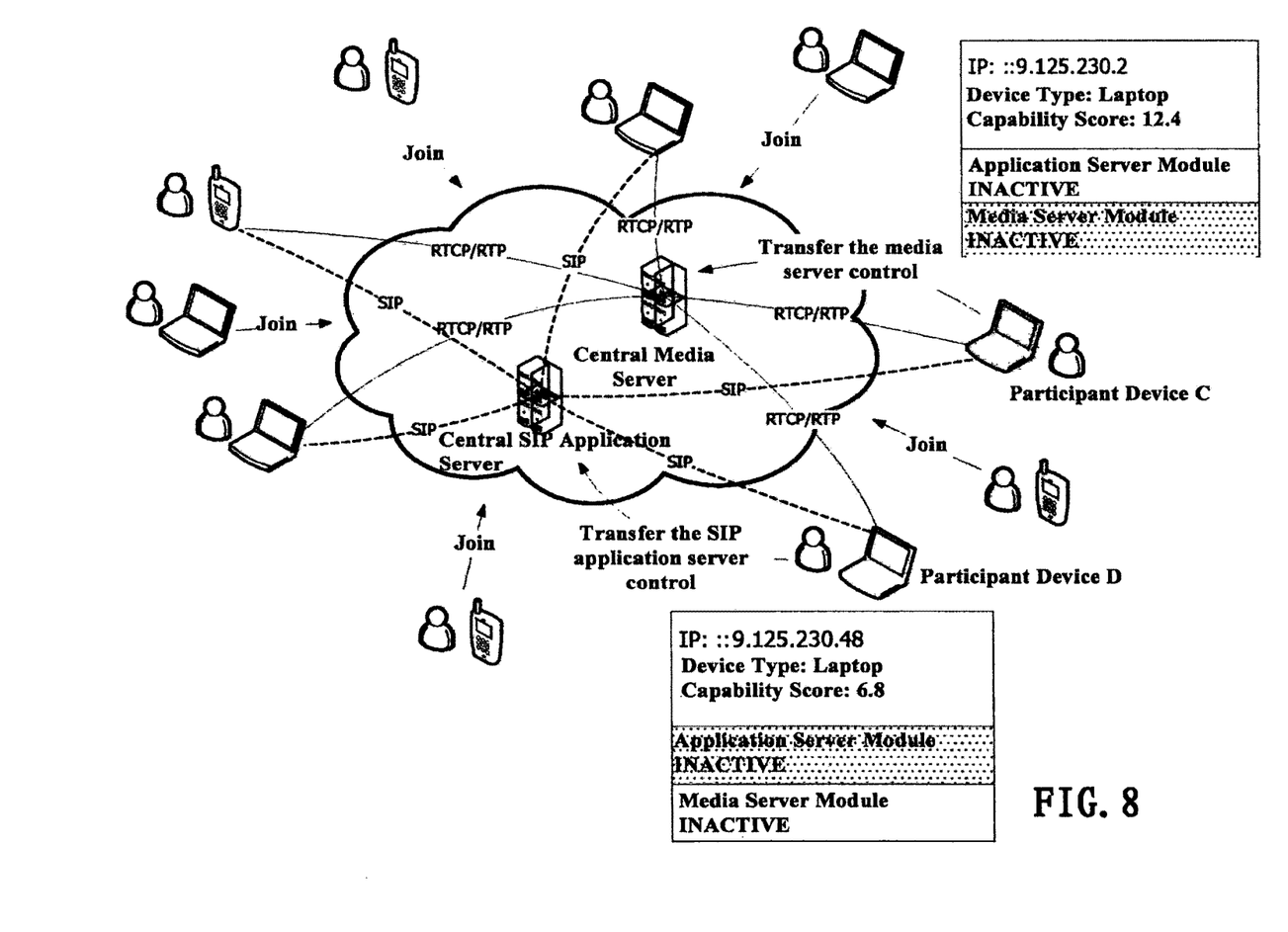
FIG. 8 is a schematic diagram showing switching of the media service device and the application service device by using the SIP protocol in accordance with an exemplary embodiment.

Referring now to FIG. 8, a schematic diagram showing switching of the media service device and the application service device by using the SIP protocol is shown. The participant devices C and D shown in FIG. 8 are the participant devices that were elected as the media service device and the application service device respectively in FIG. 7. Now as shown in FIG. 8, there are five new participant devices (denoted with "join" and an arrow) that join the built SIP protocol-based IP multimedia session with zero dependency on the central server. Since a plurality of new participant devices join the session, it is inevitable that the workloads of the participant devices C and D become heavier, and that bandwidth consumption is increased, and thereby the QoS parameter level is dropped. Assuming that the QoS parameter values of the participant devices C and D both exceed the high bound of the predetermined threshold range, the switching is carried out. However, it is found from the synthesized scores for the hardware capability and the QoS parameter level of the participant devices that, all the participant devices do not satisfy the requirements of acting as the application service device or media service device, so it is decided to switch the service device to the central server. FIG. 8 shows the situation after the completion of the switching, wherein the dotted line shows SIP signaling flow transmission, and the solid line shows actual multimedia signal flow transmission.

Figure 4:
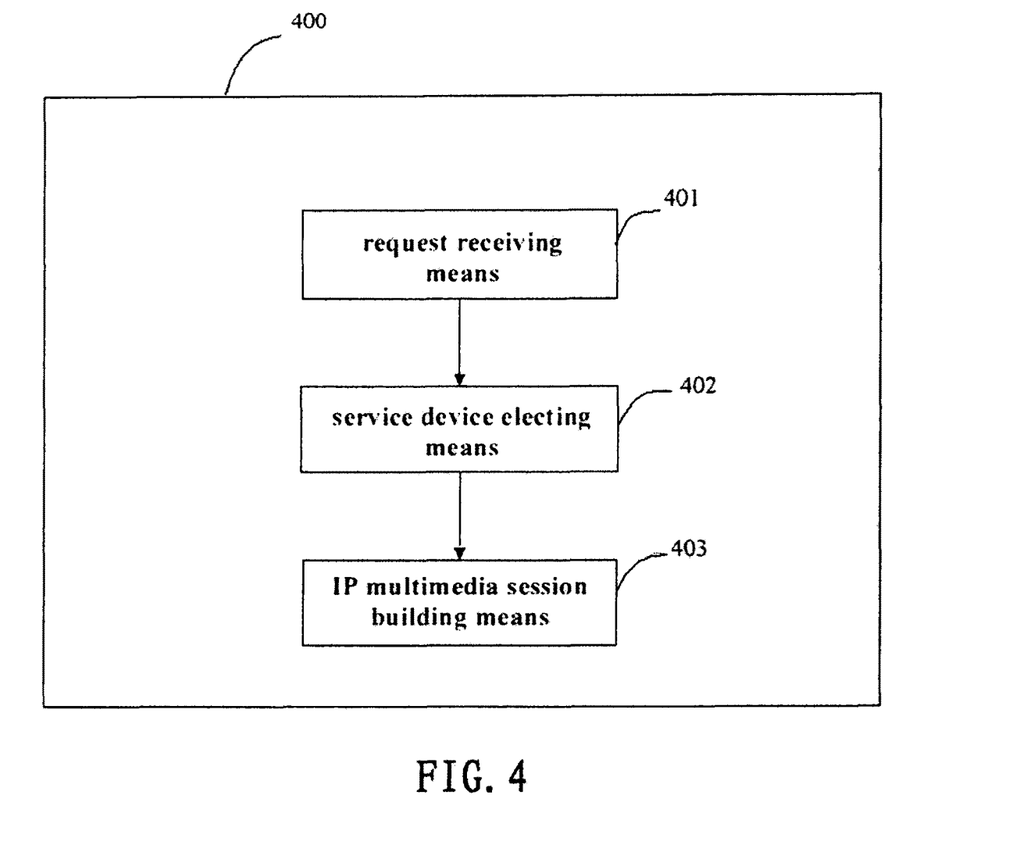
FIG. 4 is a block diagram showing a system for building an IP multimedia session according to an embodiment of the present invention.

Referring now to FIG. 4, a block diagram showing a system for building an IP multimedia session in accordance with an exemplary embodiment is shown. The system 400 shown in FIG. 4 includes a request receiving means 401 configured to receive a registering request from a plurality of IP multimedia session participant devices, service device electing means 402 configured to elect a service device from the plurality of participant devices, and IP multimedia session building means 403 configured to build IP multimedia session among the plurality of participant devices by using the elected service device. Those skilled in the art will appreciate that, the means 401-403 in the system 400 respectively correspond to the blocks 201-203 in the method shown in FIG. 2.

Figure 5:
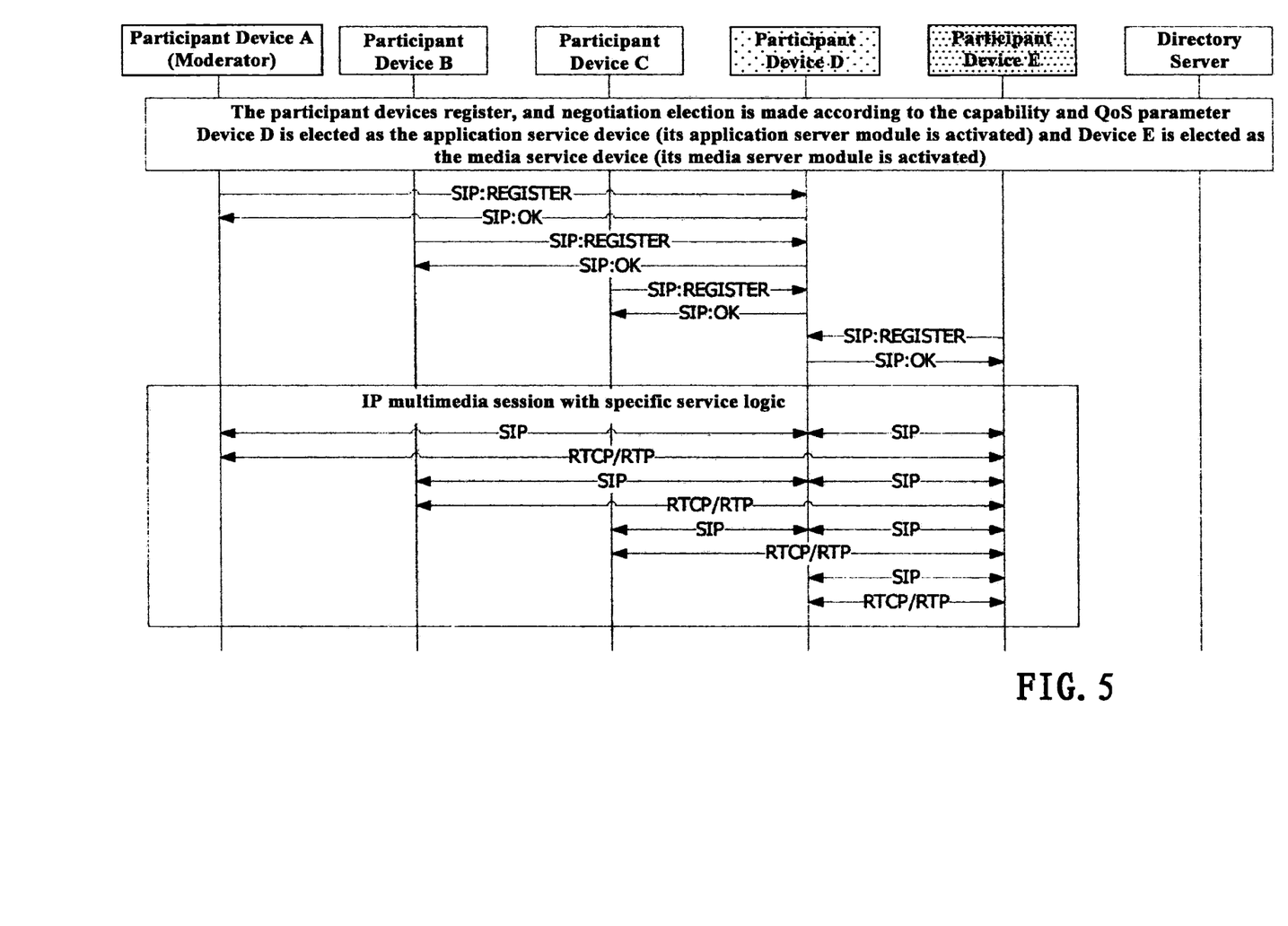
FIG. 5 is a signaling flow chart of an initial building stage of a method for building an IP multimedia session based on the Session Initiation Protocol (SIP) protocol according to an embodiment of the present invention.

Referring now to FIG. 5, a flow chart showing signaling of a method of building IP multimedia session (initial building stage) based on the SIP protocol in accordance with an exemplary embodiment is shown. As shown in FIG. 5, there are five participant devices A-E and a directory server, wherein the participant device A is a moderator. The function of the moderator is to moderate the process of electing a service device among the participant devices before building the IP multimedia session, i.e., the contents described in the uppermost text blocks in FIG. 5. There are many ways to confirm the moderator, for example, it can be specified that the participant device who firstly makes a call in the telephone conference is the moderator, or it can be specified that only a desktop computer device can act as the moderator, and so on. The function of the directory server is to receive a registering request of a participant device before building the IP multimedia session, and moderate the process of electing a service device at the initial building stage of the IP multimedia session. Therefore, in fact, it is enough to have only one of the director server and the moderator shown in FIG. 5. After electing the device D as the application service device and electing the device E as the media service device, the process of building the IP multimedia session starts. First, the other four participant devices A, B, C and E issue a registering request, i.e., SIP: REGISTER to the participant device D executing the function of the application server according to the SIP protocol specification respectively, the device D accepts their requests, so signaling SIP:OK is returned respectively. It should be noted that, according to the SIP protocol specification, if other devices do not know which device is the application service device, the application service device D can proactively issue a SIP:INVITE registering invitation to other participant devices, and then other participant devices return signaling SIP:OK to the device D. It should be further noted that, the media service device E also needs to make SIP registration with the application service device D. After the four participant devices all are registered with the application service device D, the SIP-based IP multimedia session is built, then in the process of operating the IP multimedia session, as shown in FIG. 8, all the participant devices interact with the device D to transmit the SIP signaling flow, and all the participant devices interact with the device E to transmit media control information (based on the real time transfer control protocol RTCP) and actual multimedia signals (based on the real time transfer protocol RTP).

Figure 6:
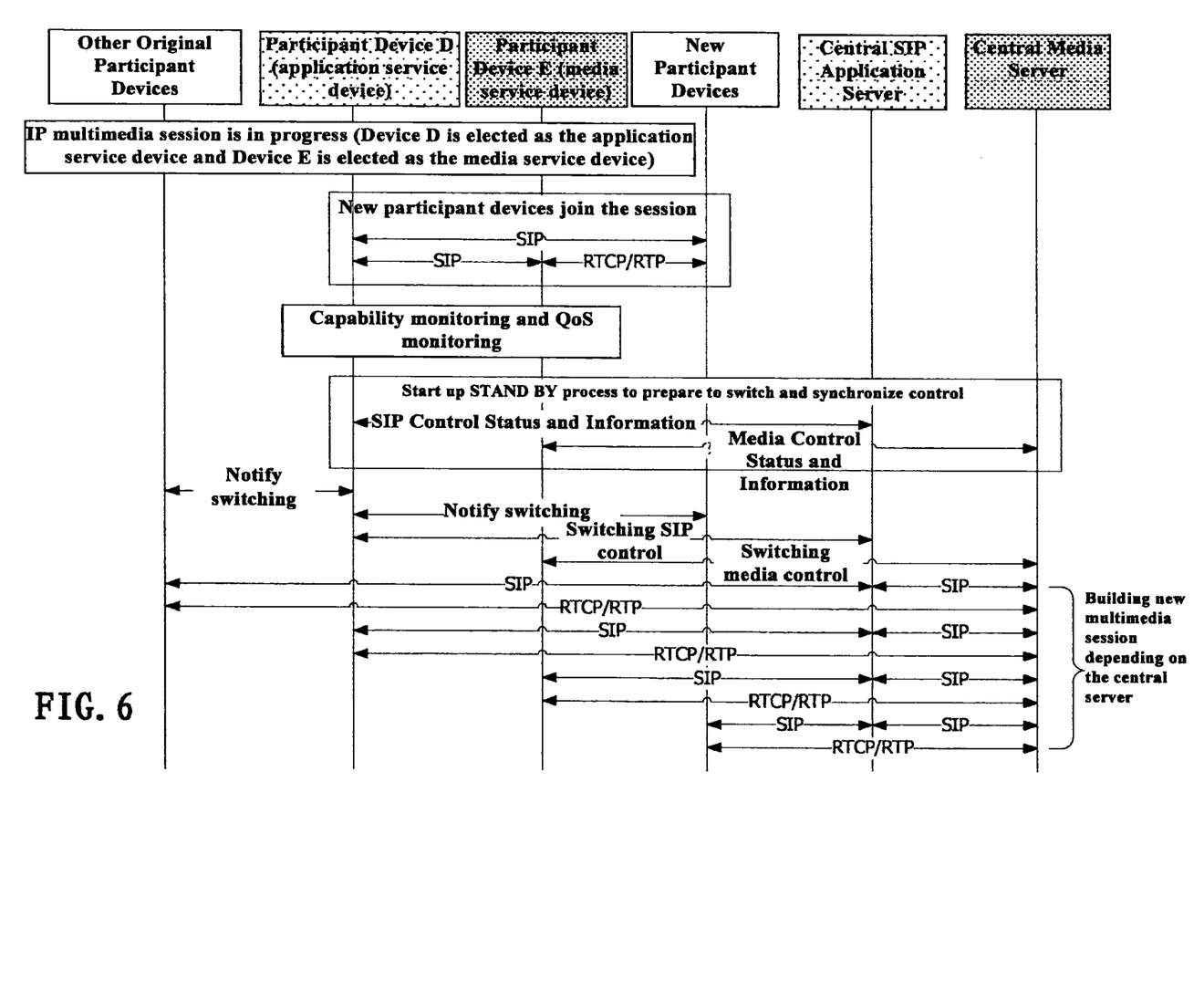
FIG. 6 is a signaling flow chart of a switching stage of a method for building an IP multimedia session based on the SIP protocol according to an embodiment of the present invention.

Referring now to FIG. 6, a flow chart showing signaling of building IP multimedia session (switching stage) in accordance with an exemplary embodiment is shown. As shown in FIG. 6, when a new participant device joins the IP multimedia session, the QoS level of the devices D and E drops and cannot satisfy the requirements of acting as the application service device and the media service device. Accordingly, a switching preparation program (Standby) is initiated, the SIP control status and information are synchronized to the central application server (target application server), and the media control status and information are synchronized to the central media server (target media server). Then, once real switching is needed (exceeds the threshold high bound), the device D notifies other original participant devices and newly joined participant devices (Notify Transferring), and then transfers the SIP control right to the central application server and transfers the media control right to the central media server in turn. After the transfer is completed, IP multimedia session depending on the central server is built.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although the method and system of building IP multimedia session according to the present invention have been described in detail above in combination with the specific embodiments, the present invention is not limited thereto. Those skilled in the art could make various variations, substitutions and modifications to the present invention according to the teaching of the specification, without departing from the spirit and scope of invention. It should be appreciated that, all these variations, substitutions and modifications still fall into the scope of protection of the present invention. The scope of protection of the present invention is defined only by the accompanying claims.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

What is claimed is:

1. A method of building an internet protocol (IP) multimedia session comprising:
   receiving a registering request from each of a plurality of IP multimedia session participant devices, wherein each of the plurality of IP multimedia session participant devices are terminal devices requesting to participate in the IP multimedia session;
   electing a application service device and a media service device from the plurality of participant devices, wherein the application service device functions as an application server for the IP multimedia session and the media service device functions as a media server for the IP multimedia session and wherein the application service device and the media service device are physically separate devices;
   building the IP multimedia session among the plurality of participant devices by using the application service device and the media service device; and
   monitoring the media service device and application service device, wherein determining that it is needed to switch the media service device or the application service device is based on a predetermined threshold for a quality of service (QoS) parameter, and wherein the monitoring comprises:
   setting a high bound and a low bound of the threshold for the QoS parameter;
   in response to the QoS parameter of the media service device or the application service device exceeding the low bound, locating a target media service device or target application service device to be switched to;
   synchronizing media control information or signaling control information to the target media service device or the target application service device; and
   in response to the QoS parameter of the media service device or the application service device exceeding the high bound, determining that it is needed to switch the media service device or application service device.

2. The method according to claim 1, wherein the media service device is used for controlling and transmitting streaming media contents among the plurality of participant devices, and the application service device is used for controlling signaling flow among the plurality of participant devices.

3. The method according to claim 2, further comprising:
   activating a media service function of the media service device; and
   activating an application service function of the application service device,
   wherein the participant devices support an IP multimedia session protocol stack for activating the media service function or the application service function.

4. The method according to claim 1, wherein a signaling flow control protocol for the built IP multimedia session is Session Initialized Protocol (SIP), and a streaming media control protocol for the built IP multimedia session is real-time transfer control protocol (RTCP), and a streaming media transmission protocol for the built IP multimedia session is real-time transfer protocol (RTP).

5. The method according to claim 2, further comprising:
   based on a determination that it is needed to switch the media service device according to the predetermined threshold for quality of service (QoS) parameter and result of the monitoring, switching the media service device to a target media service device;
   based on a determination that it is needed to switch the application service device according to the predetermined threshold for the QoS parameter, switching the application service device to a target application service device.

6. The method according to claim 5, wherein the target media service device is elected from one of another participant device and a central media server, and wherein the target application service device is elected from one of another participant device and a central application server.

7. The method according to claim 5, wherein switching the application service device comprises:
   notifying the plurality of participant devices to listen to a new port.

8. The method according to claim 1, wherein the media service device is a non-central server.

9. The method according to claim 1, wherein electing the application service device and a media service device from the plurality of participant devices comprises:
   electing the application service device and a media service device according to a hardware capability and the QoS parameter of the plurality of participant devices.

10. A computer system for building IP multimedia session, the computer system comprising:
    a non-transitory computer readable storage medium having computer readable program code embodied therewith, the computer readable program code executable by a processor to perform a method comprising:
    receiving a registering requests from each of a plurality of IP multimedia session participant devices, wherein each of the plurality of IP multimedia session participant devices are terminal devices requesting to participate in the IP multimedia session;

electing application service device and a media service device from the plurality of participant devices, wherein the application service device functions as an application server for the IP multimedia session and the media service device functions as an media server for the IP multimedia session and wherein the application service device and the media service device are physically separate devices;

building the IP multimedia session among the plurality of participant devices by using the application service device and the media service device; and monitoring the media service device and application service device, wherein determining that it is needed to switch the media service device or the application service device is based on a predetermined threshold for a quality of service (QoS) parameter, and wherein the monitoring comprises:

setting a high bound and a low bound of the threshold for the QoS parameter;

in response to the QoS parameter of the media service device or the application service device exceeding the low bound, locating a target media service device or target application service device to be switched to;

synchronizing media control information or signaling control information to the target media service device or the target application service device; and in response to the QoS parameter of the media service device or the application service device exceeding the high bound, determining that it is needed to switch the media service device or application service device.

11. The computer system according to claim 10, wherein the media service device is used for controlling and transmitting streaming media contents among the plurality of participant devices, and the application service device is used for controlling signaling flow among the plurality of participant devices.

12. The computer system according to claim 11, further comprising:

activating a media service function of the media service device;

activating an application service function of the application service device, and the participant devices support an IP multimedia session protocol stack for activating the media service function or the application service function.

13. The computer system to claim 10, wherein a signaling flow control protocol for the built IP multimedia session is Session Initialized Protocol (SIP), and a streaming media control protocol for the built IP multimedia session is Real-time Transfer Control Protocol (RTCP), and a streaming media transmission protocol for the built IP multimedia session is Real-time Transfer Protocol (RTP).

14. The computer system according to claim 11, further comprising:

based on a determination that it is needed to switch the media service device according to a predetermined threshold for the QoS parameter and result of the monitoring, switching the media service device to a target media service device;

based on a determination that it is needed to switch the application service device according to the predetermined threshold for the Quality of Service QoS parameter, switching the application service device to a target application service device.

15. The computer system according to claim 14, wherein the target media service device is elected from one of the following: another participant device or a central media server, and wherein the target application service device is elected from one of the following: another participant device or a central application server.

16. The computer system according to claim 14, wherein switching the application service device comprises:

notifying, by the processor, the plurality of participant devices to listen to a new port.

17. The computer system according to claim 10, wherein the media service device is a non-central server.

18. The computer system according to claim 10, wherein electing the application service device and a media service device from the plurality of participant devices comprises:

electing the application service device and a media service device according to a hardware capability and the QoS parameter of the plurality of participant devices.

* * * * *